United States Patent [19]

Peetz et al.

[11] 4,202,420
[45] May 13, 1980

[54] ROCK DRILL WITH HARD METAL DRILLING HEAD

[75] Inventors: Wolfgang Peetz, Blitzenreute; Siegfried Klaissle, Unterankenreute; Bernhard Moser, Altshausen, all of Fed. Rep. of Germany

[73] Assignee: Hawera Probst GmbH & Co., Ravensburg, Fed. Rep. of Germany

[21] Appl. No.: 929,269

[22] Filed: Jul. 31, 1978

[30] Foreign Application Priority Data

Aug. 5, 1977 [DE] Fed. Rep. of Germany ....... 2735368

[51] Int. Cl.² .................................................. E21C 13/08
[52] U.S. Cl. .............................. 175/395; 173/DIG. 2; 175/398; 175/405
[58] Field of Search .............. 175/395, 323, 398, 399, 175/400, 401, 402, 403, 404, 405, 409, 410, 411; 173/DIG. 2

[56] References Cited

U.S. PATENT DOCUMENTS

| | | | |
|---|---|---|---|
| 609,107 | 8/1898 | Leyner | 175/417 |
| 1,156,147 | 10/1915 | Karns | 175/420 |
| 1,554,446 | 9/1925 | Loy | 175/405 X |
| 1,561,975 | 11/1925 | Des Roches | 175/417 |
| 1,697,570 | 1/1929 | Mecom | 175/415 X |
| 1,939,991 | 12/1933 | Krusell | 175/330 X |
| 2,593,229 | 4/1952 | Wallace | 175/330 |
| 2,673,716 | 3/1954 | Avery | 175/411 X |
| 2,729,427 | 1/1956 | Davis et al. | 175/330 |
| 2,883,155 | 4/1959 | Gehrke | 175/215 X |
| 3,537,538 | 11/1970 | Generoux | 175/330 |
| 4,114,322 | 9/1978 | Greenspan | 175/379 |

Primary Examiner—James A. Leppink
Assistant Examiner—Richard E. Favreau
Attorney, Agent, or Firm—Becker & Becker, Inc.

[57] ABSTRACT

A rock drill for rotary blow drilling with a drilling head arranged at the free end of the drill shaft, which at least partially consists of hard metal. The drilling head the end face of which is circular disc shaped or circular ring shaped includes a formed piece of solid hard metal. Cutting bodies are machined out of the end of this piece of hard metal which cutting bodies have the shape of pyramids or truncated pyramids and taper with increasing distance from the drill shank.

20 Claims, 8 Drawing Figures

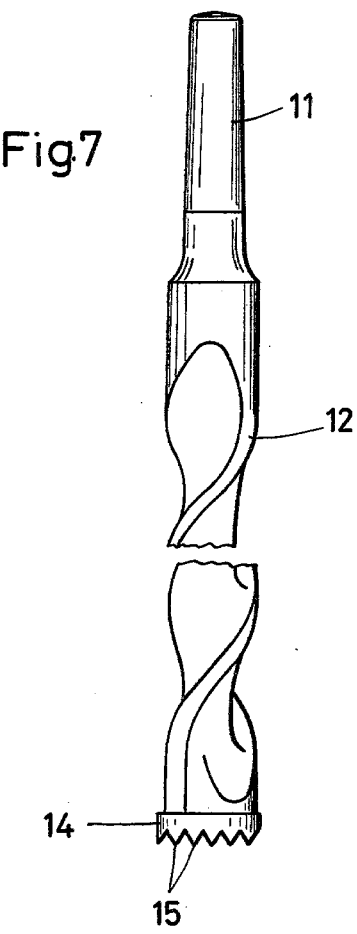
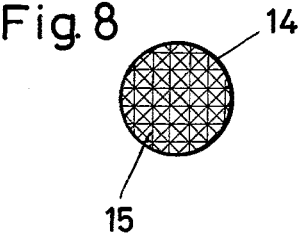

ROCK DRILL WITH HARD METAL DRILLING HEAD

The present invention relates to a rock drill for rotary blow drilling with a drilling head located at the free end of the drill shank and at least partially consisting of hard metal.

Rock drills of this type have already become known with which hard metal plates extending diametrically are inserted into the drill crown, said hard metal plates being ground roof-shaped along their longitudinal edge forming the end face of the drill crown. With these rock drills, for centering the drill in the hole to be bored, a separate centering drill is provided. In addition to two cutting edge drill crowns, also cross bits have become known with which at the end face of the drill crown a total of four hard metal cutting edges are uniformly distributed over the end face and are arranged in a cross shaped manner. However, experience has shown that with these known rock drills, a high driving power is necessary with a rapid progress of the drilling operation is to be obtained.

It is, therefore, an object of the present invention so to improve a rock drill of the above mentioned type that an increased drilling output can be obtained with the same amount of driving energy over heretofore known rock drills.

This object and other objects and advantages of the invention will appear more clearly from the following specification in connection with the accompanying drawing, in which:

FIG. 7 is a side view of a second embodiment of a rock drill according to the invention.

FIG. 8 shows the end face of the drill of FIG. 7.

The rock drill according to the invention is characterized primarily in that the drill head which has its end face designed as circular disc or circular ring, is made of a solid hard metal formed piece from the end face of which cutting bodies have been shaped which form pyramids or truncated pyramids, said cutting bodies tapering with increasing distance from the drilling shank. Expediently, the pyramid shaped cutting bodies have acute angles of about from 50°–90°. In said end face, the cutting bodies form a wafer pattern which advantageously is designed eccentrically with regard to the drill axis. As a result thereof, many small abrasive teeth are formed with the effect of an unequal tooth pitch. The advantage of this design, in addition to the above mentioned increased drilling output consists in a considerably better roundness of the drilled bore and in the possibility to cut through the iron reinforcement in reinforced concrete. Both advantages are particularly important in connection with the employment of plugs which are to be inserted into the finished drilled hole.

With a preferred embodiment of a rock drill according to the invention for holes to be drilled in which a drill preferably has a diameter of more than 15 mm and a length-diameter ratio of the bores of more than 10:1, it is provided according to a further development off the invention that the drill head is designed as annular solid hard metal tubular body the annular end face of which is provided with the pyramid shaped cutting bodies in wafer pattern. Advantageously, in view of the grinding operation during which the cutting bodies have been machined out of solid material, the cutting bodies are arranged in series with regard to each other, and these rows extend eccentrically with regard to the drilling axis.

According to a further development of the invention, with a rock drill set forth above, it is also possible, for increasing the drilling output, to arrange a plurality of pyramidal cutting bodies which are distributed over the circumferential surface of the drill head. The rock drill according to the invention is provided for use in rotary blow machines and in drifters or stopers.

Figure 1:
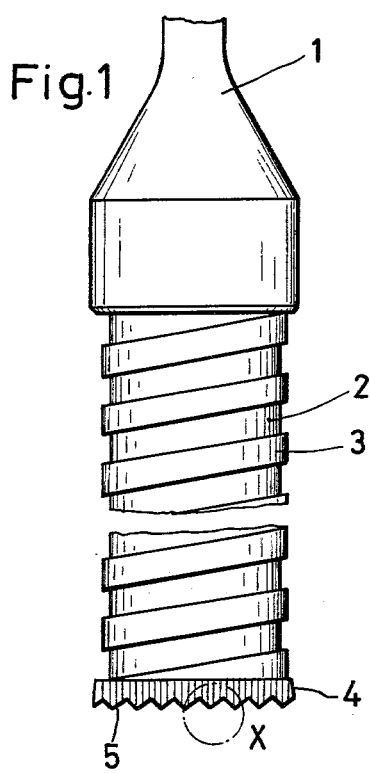
FIG. 1 represents a first embodiment of a rock drill according to the invention as seen from the side.
Figure 3:
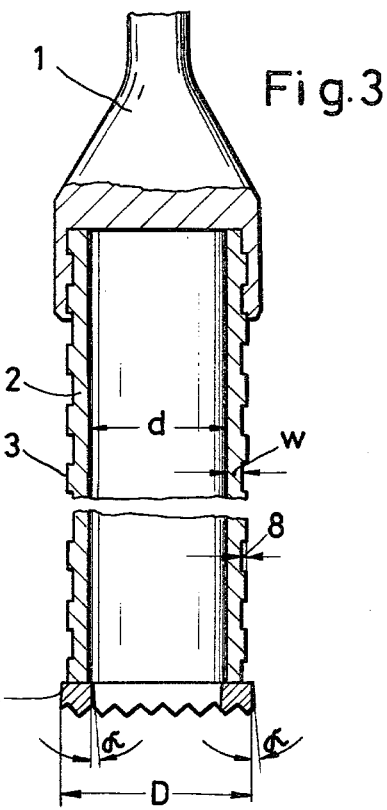
FIG. 3 is a longitudinal section through the rock drill of FIG. 1.
Figure 2:
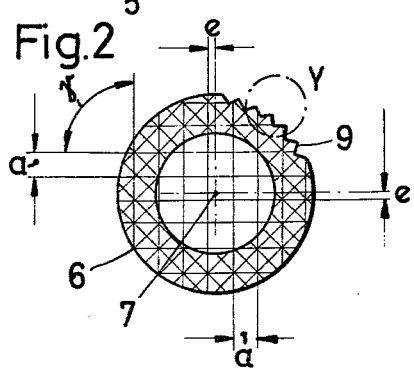
FIG. 2 represents a view of the end face of the rock drill according to FIG. 1.
Figure 4:
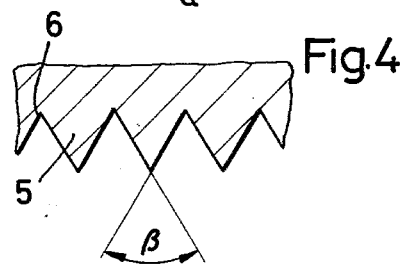
FIG. 4 illustrates the portion encircled by a dot-dash circle X of FIG. 1 but on an enlarged scale.
Figure 5:
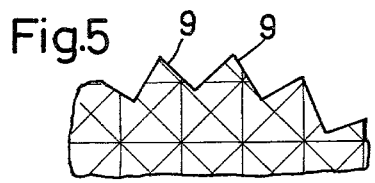
FIG. 5 shows a portion located within the dot-dash circle Y of FIG. 2, but on an enlarged scale.

Referring now to the drawings in detail, the rock drill illustrated in FIGS. 1-5 is intended for rotary blow drilling for carrying out deep drilling in masonry or concrete which drills have a diameter of more than 15 mm, while the length-diameter ratio of said drills is greater than 10:1. The drill has a chucking shank 1 for connection in a rotary blow and in drifters or stopers. The drill shank 2 is, as shown in FIG. 3, tubular and has its circumferential surface provided with a conveying spiral with a pitch of about 10 mm. The drill shank 2 is at its free end face firmly connected to a solid hard metal cutting ring by hard soldering, the cutting ring 4 of which its end face is shown in FIG. 2 has its end face provided with cutting bodies 5 designed as pyramids or truncated pyramids. These cutting bodies 5 have been formed out of the cutting ring for grinding. The cutting bodies 5 are in conformity with FIG. 4 provided with tip angles $\beta$ of from 40°–90°. The base lines 6 which are formed by grinding out the pyramidal cutting bodies 5 and which confine the non-numbered square shaped ground surfaces of the cutting bodies, intersect at an angle $\gamma$. These cutting bodies extend at a mutual distance a which determines the raster pattern of the wafered grating which is formed by the cutting bodies 5 and amounts to about 1–6 mm, preferably about from 3–4 mm. As is furthermore shown in FIG. 2, the base lines 6 which are adjacent the axis of rotation 7 of the drill extend at a certain distance which determines the eccentricity of the wafer pattern relative to the axis of rotation 7. Due to this eccentric arrangement of the waffle-like grating (wafer field) relative to the axis of rotation 7, the effect of the unequal tooth pitch is obtained although all cutting bodies 5 are of equal size and accordingly are uniformly distributed over the end face of the drill crown.

The advantage of the design of the solid hard metal cutting ring 4 is seen in the fact that the illustrated drill for centering will in contrast to the heretofore known drill crowns require no special centering drill but by means of the chisel blow of the non-illustrated driving machine, which blow is exerted in the longitudinal direction, it is necessary only to drive a few millimeters deep whereupon directly the rotary blow of the driving machine can be turned on. The drilling output of the rock drill according to the invention is over heretofore known rock drills, due to the rock diminution occurring at the end face only of said annular drill head, higher by about 30% because with a progressing drill operation, a drilling core remains standing just slightly less than the inner diameter d of the drill shank 2. The elimination of the drill core from the drill shank is no problem whatsoever because by separating the drill shank from the shank chucking part of the machine, the drill core can be removed toward the rear. In this connection, it is important that the clear pipe diameter within the region of the chucking shank is maintained.

The conveying spiral 3 designed in the form of a thread suffices for the drilling dust transport as has been proved by practical tests. An additional withdrawal of the drilling dust is not necessary and as it would appear from tests carried out so far, does not result in any material improvement in the drilling output.

With the illustrated embodiment, the connection between the drill shank and the chucking shank is established by the conveying spiral 3 which directly serves as thread and after completed drilling operations will without difficulties permit that the drill shank 2 can be separated from the chucking shank 1 by merely unscrewing. As shown in FIGS. 1 and 3, the conveying spiral 3 has only a slight groove depth 8. In view of this slight groove depth 8 of the conveying spiral, the axial radiation surfaces which are responsible for the sound transmission with the longitudinal oscillation of the drill during the drilling process are very small. A comparative noise measuring of a standard helical drill and a rock drill according to the invention shows a reduction in the noise by from 10-15 db.

This advantage of the reduced sound emission is due not only to the reduction in the radiation surfaces but is also due to the damping of high frequency bending vibrations which is made possible by the geometrically favorable cross section of the drill shank 2. A further material advantage of the drill according to the invention consists in the possibility that in addition to the known building materials such as masonry and concrete, also additional wire reinforcements embedded in the building material and having diameters up to 10 mm can be cut through. This is realized by the configuration of the cutting bodies in the hard metal cutting ring 4 because these cutting bodies, due to their great number and uneven arrangement act like a miller.

Figure 6:
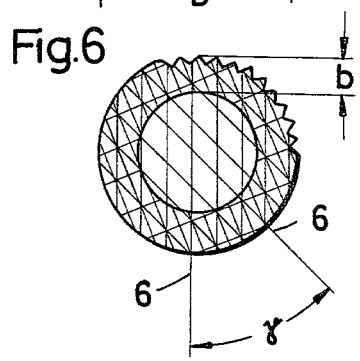
FIG. 6 shows a modification of the end face shown in FIG. 2 of the drill of FIG. 1.

With the rock drill having its end face modified as shown in FIG. 6, the pyramidal cutting bodies are diamond shaped at their base surface. The base lines 6 by means of which the base surfaces of the pyramidal cutting bodies 5 are confined, intersect each other at an angle $\gamma$ of 45°. Independently of the square or diamond shaped design of the base surface of the pyramidal cutting bodies 5, it is with both embodiments provided that also on the circumferential surface of the drill head 4 there are numerous cutting teeth 9 machined out of the drill head, said cutting teeth 9 having a triangular cross section. With both embodiments of the drill head according to the invention, the solid hard metal cutting ring 4 is expediently on its inner diameter and/or outer diameter d axially relief ground by an angle $\alpha$ according to FIG. 3 which may amount from 1°-10°.

With both embodiments of the rock drills according to the invention and illustrated in FIGS. 2 and 6, the cutting ring width b may amount to from 1.1 to 2.0 times the wall thickness W. The above mentioned eccentricity e of the wafered pattern relative to the axis of rotation 7 of the drill expediently amounts to from 0.1 to 0.9 of the wafer spacing a preferably about equal $e = 0.5 \times a$.

The rock drill illustrated as second embodiment of FIGS. 7 and 8 may preferably be employed for making drill holes with less than 20 mm outer diameter, and has a drill shank 12 which forms one piece with its slightly conical chuck shank 11. The drill shank 12 may be designed as a single or double thread helix. A drilling head 14 which when seen in top view is circular disc shaped and is solid onto the free end face. This drilling head 14 is designed as solid metal full circular disc and at its end face free disc surface located on the end face carries numerous pyramidal cutting bodies 15 which are machined out by grinding from the hard metal disc and which respectively have square shaped base surfaces.

The important advantage of this tool becomes particularly evident when employing the tool for dowel art and consists in that the prepared drilling hole has a considerably improved roundness, and that in addition thereto without difficulties it is possible to cut through iron reinforcement having a thickness of up to 10 mm.

It is, of course, to be understood that the present invention is, by no means, limited to the specific showing in the drawing but also comprises any modifications within the scope of the appended claims.

What is claimed is:

1. A rock drill for rotary blow drilling which includes: a chucking shank, a drill shank, a drilling head at least partly consisting of hard metal, one end of said drill shank being connected to said chucking shank while the other end of said drill shank has connected thereto said drilling head, said drilling head consisting of a solid formed piece having the outer end face thereof provided with pyramidal cutting bodies forming a single integral piece with said formed piece and tapering with increasing distance from said drill shank, the base surfaces of said pyramidal cutting bodies being diamond-shaped and having a corner angle of about 45°.

2. A rock drill according to claim 1, in which adjacent base surfaces of said pyramidal cutting bodies have a wafered grating space therebetween amounting to from 1 to 6 mm.

3. A rock drill according to claim 2, in which the wafered grating formed by said cutting bodies is arranged eccentrically with regard to the axis of rotation of said drill, the eccentricity amount to from 0.1 to 0.9 times the wafered grating.

4. A rock drill according to claim 2, in which the wafered grating formed by aid cutting bodies is arranged eccentrically with regard to the axis of rotation of said drill, the eccentricity amounting to 0.5 times the wafered grating.

5. A rock drill according to claim 2, in which the wafered grating formed by said cutting bodies is arranged coaxially with regard to the axis of rotation of said drill.

6. A rock drill according to claim 5, in which aid drilling head has an inner mantle and an outer mantle, and in which one of said mantles is axially relief round by an angle $\alpha$ of from 1° to 10°.

7. A rock drill for rotary blow drilling, which includes: a chucking shank, a drill shank, a drilling head at least partly consisting of hard metal, one end of said drill shank being connected to said chucking shank while the other end of said drill shank has connected thereto said drilling head, said drilling head consisting of a solid formed piece having the outer end face thereof provided with pyramidal cutting bodies forming a single integral piece with said formed piece and tapering with increasing distance from said drill shank, adjacent base surfaces of said pyramidal cutting bodies having a wafered grating space therebetween amounting to from 1 to 6 mm, the wafered grating formed by said cutting bodies is arranged eccentrically with regard to the axis of rotation of said drill, the eccentricity amounting to 0.5 times the wafered grating, the outer surface of said drill shank being provided with a conveying spiral.

8. A rock drill according to claim 7, in which said cutting bodies have a tip angle of from 50° to 90°.

9. A rock drill according to claim 7, in which the base surfaces of said pyramidal cutting bodies are square shaped.

10. A rock drill according to claim 7, in which the drilling head connected to the drill shank is designed as an annular disc.

11. A rock drill according to claim 7, in which said drilling head is annular and the width of said drilling head amounts to from 1.1 to 2 times the wall thickness of said drill shank.

12. A rock drill according to claim 7, in which the circumferential surface of said drilling head is provided with pyramidal cutting bodies machined out of the hard metal of said drilling head.

13. A rock drill according to claim 7, in which said hard metal drilling head is hard soldered to said drill shank.

14. A rock drill according to claim 7, in which said conveying spiral is designed in the manner of a rectangular thread.

15. A rock drill according to claim 14, in which the conveying spiral has a pitch of about 10 mm.

16. A rock drill according to claim 14, in which the conveyor spiral represents a thread connection of said drill shank with said chucking shank.

17. A rock drill according to claim 16, in which the drill shank provided with an inner diameter bore is detachably connected to said chucking shank.

18. A rock drill for rotary blow drilling, which includes: a chucking shank, a drill shank, a drilling head at least partly consisting of hard metal, one end of said drill shank being connected to said chucking shank while the other end of said drill shank has connected thereto said drilling head, said drilling head consisting of a solid formed piece having the outer end face thereof provided with pyramidal cutting bodies forming a single integral piece with said formed piece and tapering with increasing distance from said drill shank, adjacent base surfaces of said pyramidal cutting bodies having a wafered grating space therebetween amounting to form 1 to 6 mm, the wafered grating formed by said cutting bodies being arranged coaxially with regard to the axis of rotation of said drill, the width of said drilling head amounting to from 1 to 2 times the wafered grating.

19. A rock drill according to claim 18, in which said drill shank is tubular.

20. A rock drill according to claim 19, in which the ratio of the wall thickness of said drill shank to the outer diameter of said drill shank amounts to from 1:5 to 1:10.

* * * * *